US009323725B2

(12) United States Patent
Kahle

(10) Patent No.: US 9,323,725 B2
(45) Date of Patent: Apr. 26, 2016

(54) MULTI-MODE IMAGE CAPTURE SYSTEMS AND METHODS

(71) Applicant: Todd Kahle, Hartford, WI (US)

(72) Inventor: Todd Kahle, Hartford, WI (US)

(73) Assignee: E-Image Data Corporation, Hartford, WI (US)

( * ) Notice: Subject to any disclaimer, the term of this patent is extended or adjusted under 35 U.S.C. 154(b) by 0 days.

(21) Appl. No.: 14/603,746

(22) Filed: Jan. 23, 2015

(65) Prior Publication Data

US 2015/0212979 A1   Jul. 30, 2015

Related U.S. Application Data

(60) Provisional application No. 61/931,352, filed on Jan. 24, 2014.

(51) Int. Cl.
| | |
|---|---|
| *H04N 1/04* | (2006.01) |
| *G06F 3/12* | (2006.01) |
| *G06F 17/21* | (2006.01) |
| *H04N 1/21* | (2006.01) |
| *H04N 1/40* | (2006.01) |
| *H04N 1/48* | (2006.01) |
| *H04N 1/32* | (2006.01) |

(52) U.S. Cl.
CPC ............ *G06F 17/211* (2013.01); *H04N 1/2104* (2013.01); *H04N 1/32128* (2013.01); *H04N 1/40062* (2013.01); *H04N 1/40087* (2013.01); *H04N 1/48* (2013.01); *H04N 2201/325* (2013.01)

(58) Field of Classification Search
CPC . H04N 5/23219; H04N 5/2258; H04N 5/345; H04N 2201/3252; G06T 2207/30216; G06T 7/0081; G06T 2207/10004; G06T 2207/30168; G06T 3/4038; G06T 2207/30196; G06T 5/005; G06T 1/0007

USPC .............. 358/474, 482, 483; 348/239, 222.1, 348/E17.002, E5.001, E5.024, E5.031, 348/E5.038, E5.051, E5.056, E5.081, 348/207.1, 231.3, 370; 382/275, 165, 173, 382/199, 209, 224, 254, 255, 284, 289

See application file for complete search history.

(56) References Cited

U.S. PATENT DOCUMENTS

| | | | |
|---|---|---|---|
| 5,132,786 A * | 7/1992 | Ishiwata ....................... 358/500 |
| 5,335,082 A * | 8/1994 | Sable ............................ 347/232 |
| 6,344,906 B1 * | 2/2002 | Gatto et al. ................... 358/443 |
| 6,378,082 B1 * | 4/2002 | Rajappa .............. G06F 13/4072 713/400 |
| 6,816,612 B2 * | 11/2004 | Tsai et al. ..................... 382/165 |
| 6,943,904 B1 * | 9/2005 | Dance et al. ................. 358/1.13 |
| 7,225,444 B1 * | 5/2007 | Yung ................. G06F 17/30445 707/999.001 |
| 8,971,587 B2 * | 3/2015 | Macciola et al. ............. 382/112 |
| 9,022,280 B2 * | 5/2015 | GoyaL .............. G06F 17/30879 235/375 |
| 2003/0002733 A1 | 1/2003 | Tsai et al. |
| 2003/0099411 A1 * | 5/2003 | Kokemohr ................... 382/309 |
| 2005/0226529 A1 * | 10/2005 | Kondo ...................... G06T 3/40 382/276 |
| 2008/0084476 A1 * | 4/2008 | Toda .......................... 348/207.2 |
| 2008/0170252 A1 | 7/2008 | Fukui |

(Continued)

OTHER PUBLICATIONS

European Search Report and Written Opinion; PCT/US2015/012614; dated Apr. 21, 2015; 11 pages.

*Primary Examiner* — Negussie Worku
(74) *Attorney, Agent, or Firm* — Quarles & Brady LLP

(57) ABSTRACT

Systems and methods to generate a multi-mode image containing different modes such as color, grayscale, and black and white to minimize digital file size while retaining the desired modes for selected portions of the image.

31 Claims, 18 Drawing Sheets

(56) References Cited

U.S. PATENT DOCUMENTS

| | | | |
|---|---|---|---|
| 2009/0323095 A1* | 12/2009 | Tanimoto et al. | 358/1.13 |
| 2012/0287487 A1* | 11/2012 | Nagarajan | 358/505 |
| 2015/0039637 A1* | 2/2015 | Neuhauser et al. | 707/758 |
| 2015/0062658 A1* | 3/2015 | Mori | H04N 1/00803 358/3.01 |
| 2015/0234929 A1* | 8/2015 | Goyal | G06K 7/1404 235/375 |

* cited by examiner

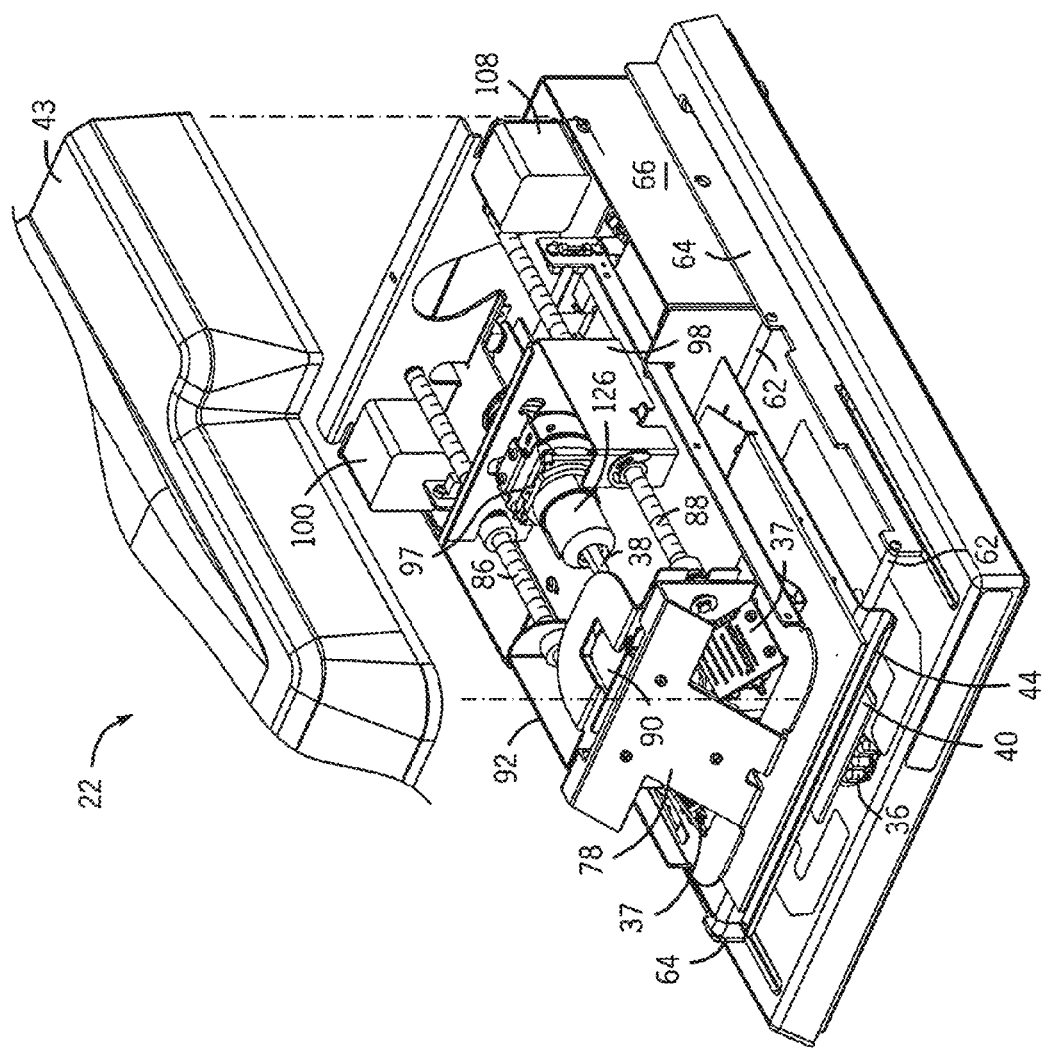

MULTI-MODE IMAGE CAPTURE SYSTEMS AND METHODS

CROSS-REFERENCE TO RELATED APPLICATIONS

This application claims the benefit of U.S. Provisional Patent Application Ser. No. 61/931,352, filed Jan. 24, 2014, and entitled "Multi-Mode Image Capture Systems and Methods," which is hereby incorporated by reference.

FIELD OF THE INVENTION

The present invention relates generally to capturing an image of a document, and more particularly to capturing an image of a document such that different types of detail within a document can be saved in different modes within the same image.

BACKGROUND OF THE INVENTION

Capturing images of documents has been known for years and involves using electronic scanners, whether microfilm or original document scanners, to capture images of documents in one of color, grayscale, or black and white modes. Most documents have a combination of color and/or grayscale areas (such as pictures) as well as black and white areas (such as text). Of these documents, the total document area containing black and white is usually much larger than the total document area containing color and/or grayscale. If a document to be captured contains only black and white and does not contain color or various shades of gray, the user might choose the black and white capture mode. This would likely result in a captured image with the best appearance, that of black information on a white background, and also the smallest file size.

If a document to be captured contains color, and the preservation of color is important, the user will choose the color capture mode. This choice of the color mode represents a significant compromise. Although the document color is preserved in the captured image, the resulting file size is larger than if either of the grayscale or black and white capture modes had been chosen. Furthermore, black and white areas will not have the best appearance. Rather than appearing as black information on a white background, the black and white areas will have the less desirable appearance of dark gray information on a light gray background.

If a document to be captured does not contain color but does have some various shades of gray, and the preservation of the various shades of gray is important, the user might choose the grayscale capture mode. The choice of the grayscale mode represents a significant compromise. Although the various shades of gray are preserved in the captured image, the resulting file size, although smaller than a color capture mode file, is larger than if the black and white capture mode had been chosen. Furthermore, black and white areas will not have the best appearance. Rather than appearing as black information on a white background, the black and white areas will have the less desirable appearance of dark gray information on a light gray background.

File size is important for many reasons. File size dictates how many documents can be stored on digital storage devices such as hard drives, CDs, DVDs, and flash drives as non-limiting examples. File size impacts the speed of downloading or uploading files. Also, email systems often limit the file size allowed to be transmitted.

What is needed in the art is systems and methods that can selectively capture an image of a document having a combination of color, grayscale, and/or black and white parts such that the file size can be reduced while maintaining high captured image quality.

SUMMARY OF THE INVENTION

The present invention provides systems and methods for capturing an image of a document having a combination of color, grayscale, and/or black and white parts such that within the same image file, subparts of the document can be captured in color mode, subparts of the document can be captured in grayscale mode, and/or subparts of the document can be captured in black and white mode. In this context, document is to be interpreted broadly in that a document can be a piece of paper, a photograph, a magazine, a book, microform, microfiche, or an electronic file of an imaged document, as non-limiting examples.

A multi-mode image file consisting of any combination of color, grayscale and black and white modes can be generated reducing file size while maintaining high captured image quality. The text areas of a document can be reduced to black and white, which compresses more efficiently than if kept in either the color or grayscale modes. In addition, the systems and methods may also use optical character recognition (OCR) to convert unrecognized text to machine encoded text.

In accordance with embodiments of the invention, methods are disclosed for generating a multi-mode image file. The methods comprise forming an image of a document onto an area sensor; the area sensor creating a digital image of the document, the digital image having a first mode; selecting a region of the digital image to be modified; assigning a second mode different than the first mode to the selected region of the digital image; and storing the modified digital image as a multi-mode image in memory.

In accordance with additional embodiments of the invention, methods are disclosed for generating a multi-mode image file. The methods comprise providing an image on a video display, the image being displayed in a first mode; receiving an indication of a select region on the display for assigning a second mode; converting the select region on the display from the first mode to the second mode to generate the multi-mode image file; and displaying the multi-mode image on the display, the multi-mode image on the display displaying both the first mode and the second mode.

In accordance with additional embodiments of the invention, digital imaging systems are disclosed for generating a multi-mode image file. The systems comprise a digital imaging apparatus to image a document to generate a multi-mode image file. A computer includes at least one processor and a computer-readable storage medium readable by the at least one processor, the computer-readable storage medium having at least one instruction causing the at least one processor to: provide a digital image, the digital image having a first mode; select a region of the digital image; and assign a second mode to the selected region of the digital image to generate the multi-mode image file.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is an fragmentary, exploded perspective view of the digital microform imaging apparatus used with the system of FIG. 1;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE PREFERRED EMBODIMENT

Figure 1:
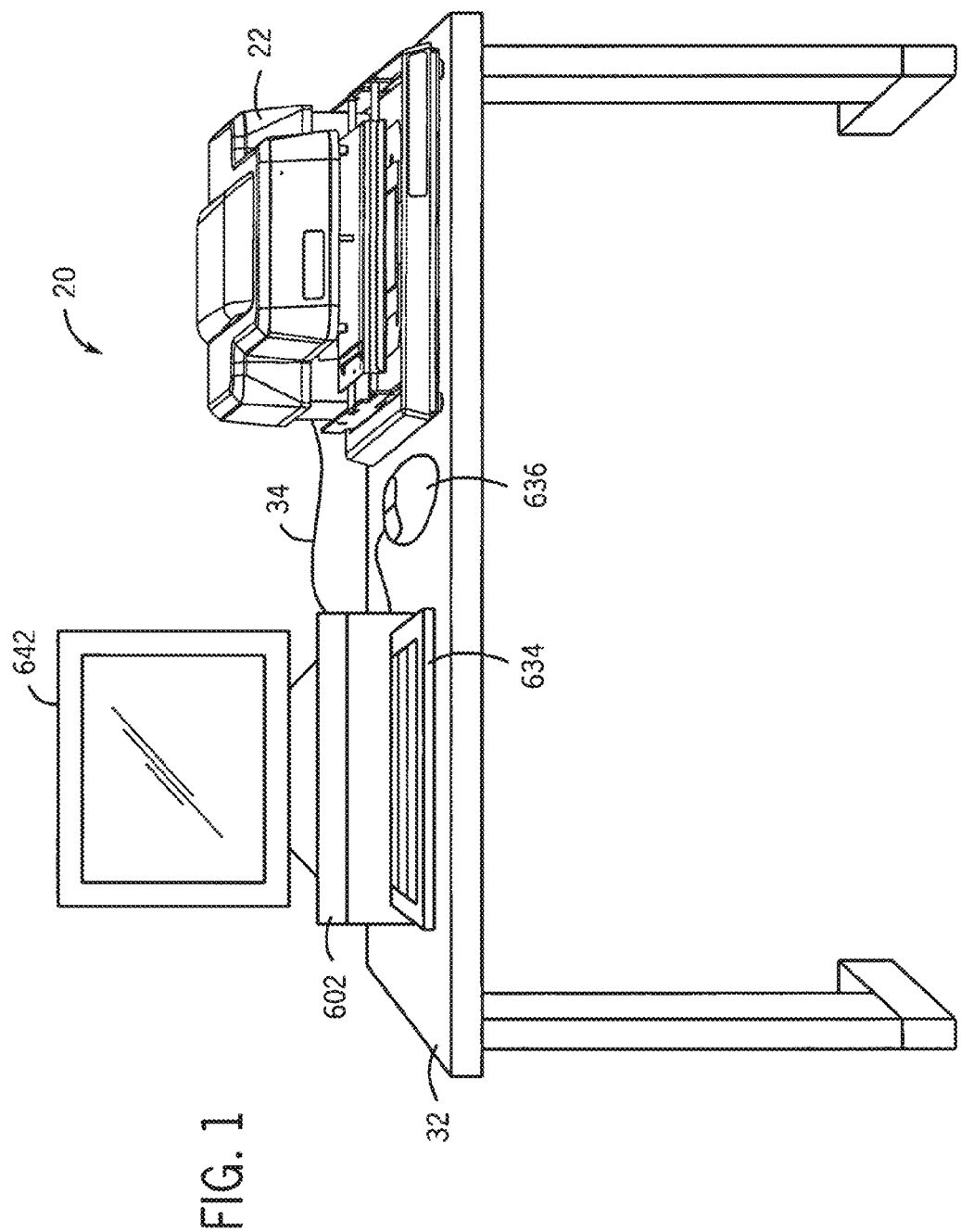
FIG. 1 is a perspective view of an embodiment of a digital microform imaging system according to the present invention.

Referring now to the drawings, and more particularly to FIG. 1, there is shown a digital microform imaging system 20 which generally includes digital microform imaging apparatus (DMIA) 22 connected to a computer 602. Computer 602 can include one or more displays 642, and user input devices such as a keyboard 634 and mouse 636. DMIA 22 and computer 602 can be placed on a work surface 32 of a desk, or other work surfaces, for convenient access and ease of use.

DMIA 22 can be electrically connected to computer 602 via cable 34, which may provide communication using a FireWire IEEE 1394 standard, for example. Although cable 34 is described as an electrical type cable, alternatively DMIA 22 and computer 602 can communicate via fiber optics, or wirelessly through infrared or radio frequencies, for example. Other details of computer 602 and the general computing environment are discussed in more detail below and shown in FIG. 12. DMIA 22 is described in U.S. Pat. No. 8,269,890, titled "DIGITAL MICROFORM IMAGING APPARATUS", filed May 15, 2007, which application is incorporated by reference as if fully set forth herein.

Referring more particularly to FIGS. 2A-4, DMIA 22 includes an approximately monochromatic illumination source 36, such as a light emitting diode (LED) array or other monochromatic illumination source, transmitting an incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source. DMIA 22 can include cover 43 to help protect the inner elements of DMIA 22.

Figure 2B:
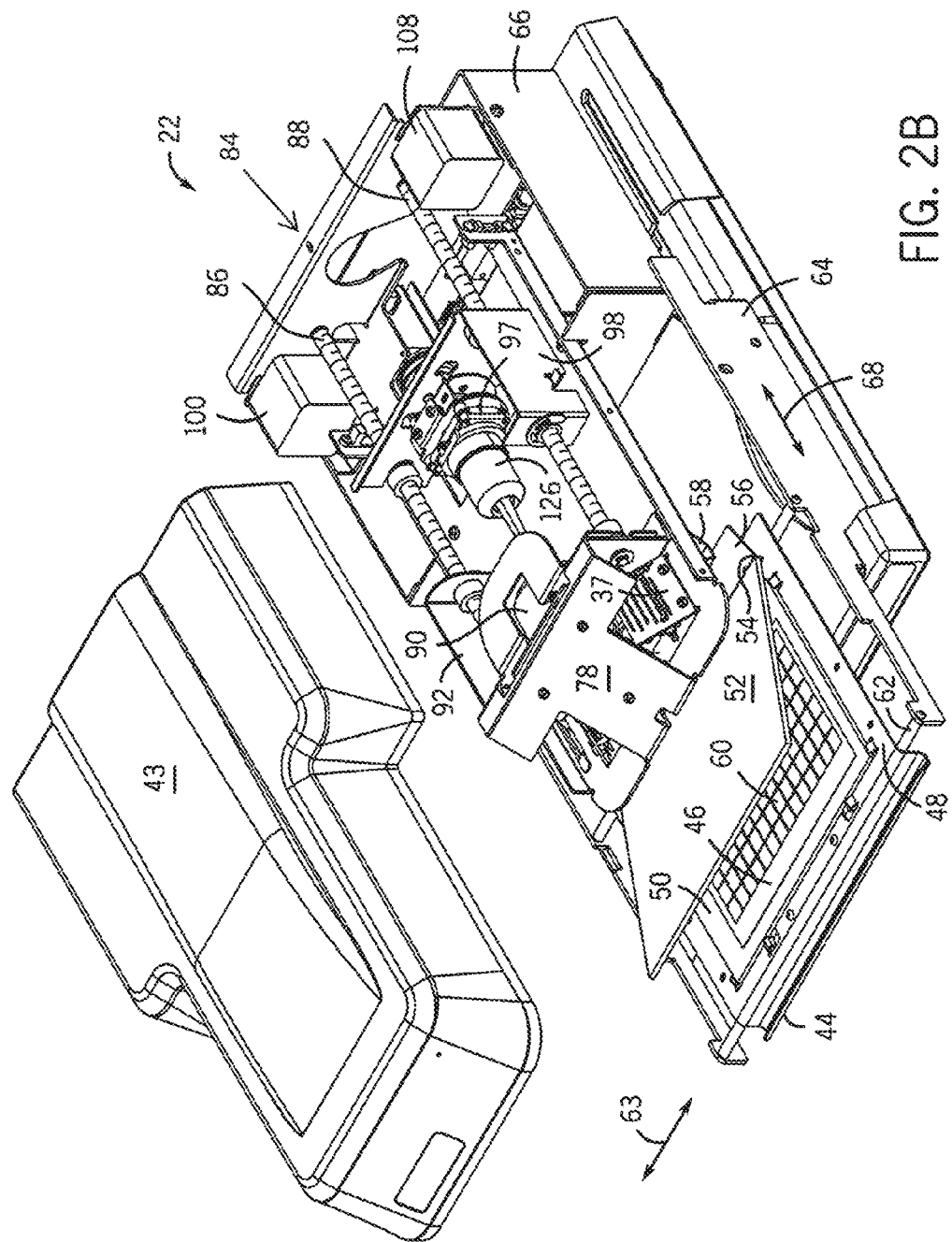
FIG. 2B is an exploded, fragmentary, perspective view of the digital microform imaging apparatus of FIG. 2A, illustrating particularly the X-Y table mobility.
Figure 3:
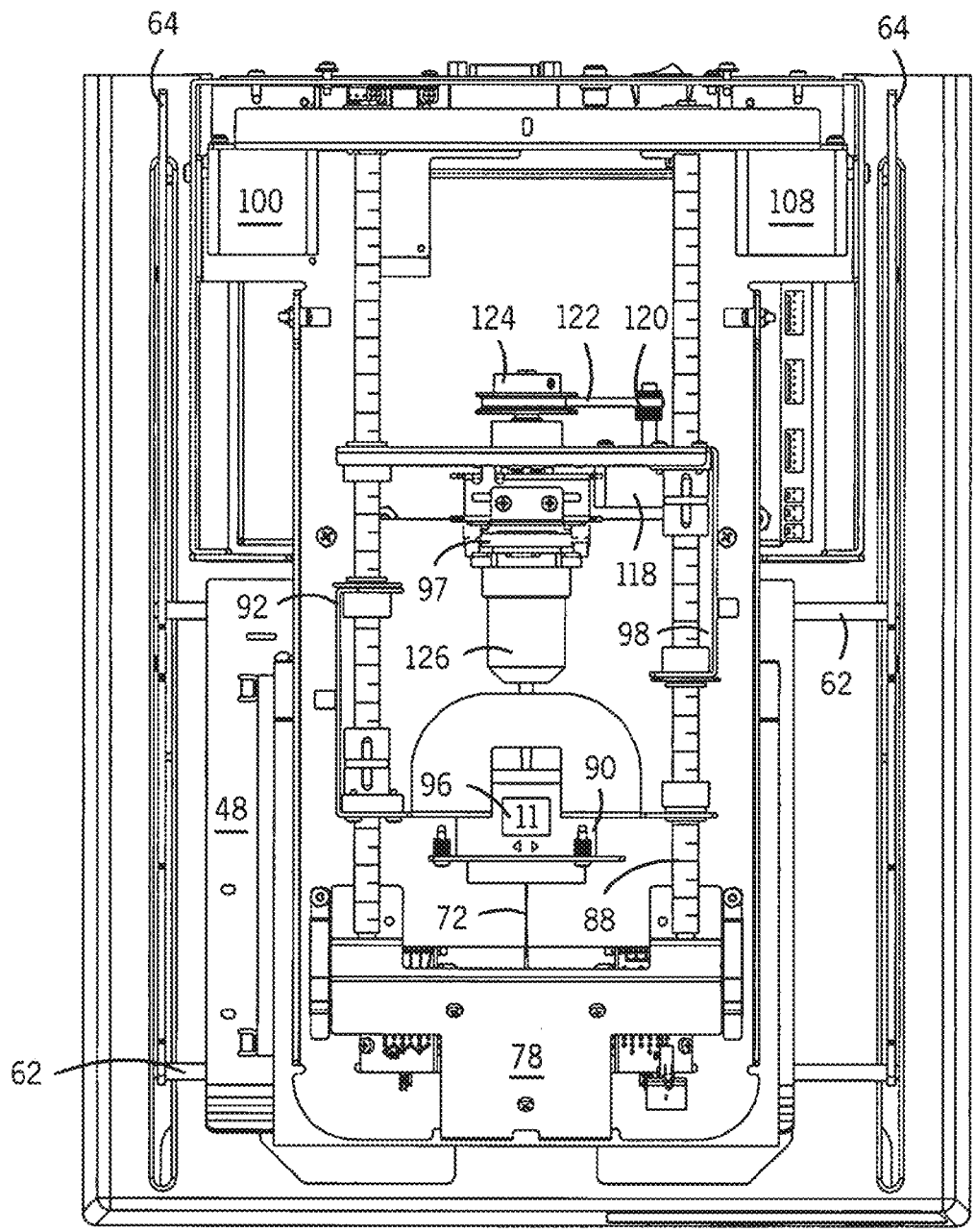
FIG. 3 is a top view of the digital microform imaging apparatus of FIG. 2A.
Figure 4:
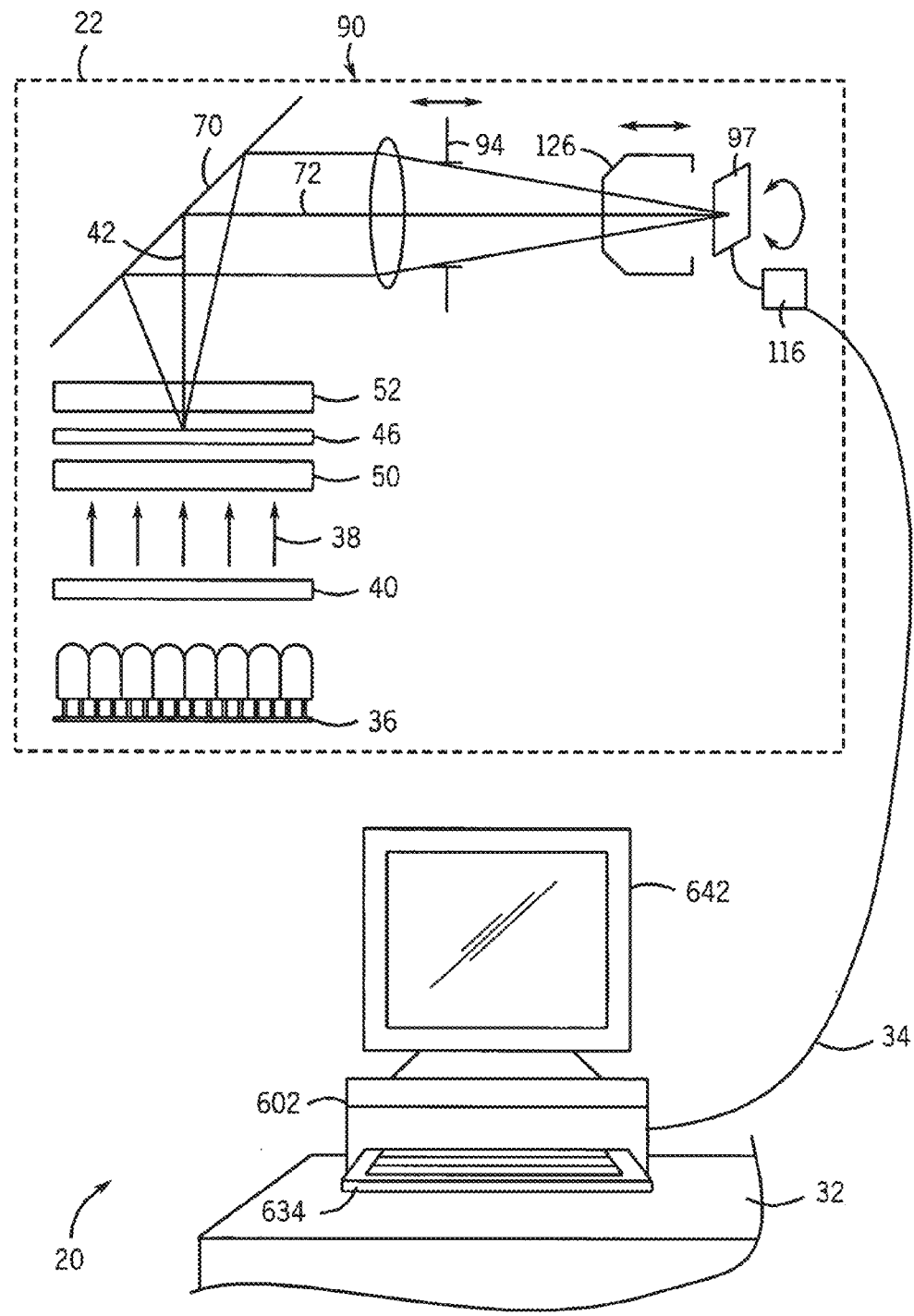
FIG. 4 is a schematic view of the digital microform imaging system of FIG. 1.

A microform media support 44 is configured to support a microform media 46 after diffuse window 40 and along first optical axis 42. In the embodiment shown support 44 is an X-Y table, that is, support 44 is movable in a plane which is approximately orthogonal to first optical axis 42. Referring particularly to FIGS. 2A and 2B, microform media support 44 includes frame 48 which supports first window 50 on one side of microform media 46, and second window 52 on the other side of microform media 46. Second window 52 hinges upward at 54 when frame 48 is moved forward to the extent that lever 56 (connected to second window 52) contacts ramps 58 (one ramp on either side), and similarly, hinges downward at 54 when frame 48 is moved rearward as lever 56 is released from contact with ramp 58. In this way the microform media 46, shown as a microfiche film with an array of images or microform segments 60, can be placed and held securely between windows 50, 52 for viewing. Frame 48, along with windows 50, 52 and media 46, are slidingly supported on rods 62 by bearings (not shown) to allow a transverse movement 63 of frame 48, windows 50, 52 and media 46. Rods 62 are connected to brackets 64, which brackets are slidingly supported by chassis 66 and bearings (not shown) to allow a longitudinal movement 68 of frame 48, windows 50, 52, media 46 and rods 62.

An approximately 45 degree fold mirror 70 (FIGS. 3 and 4) reflects the incident light transmitted through microform media 46 approximately 90 degree along a second optical axis 72. First optical axis 42 and second optical axis 72 can be thought of as segments of the single or main optical axis. Mirror 70 is connected by a three point mount to mirror mount 78 by fasteners and springs. Mirror mount 78 is connected to chassis 66 as shown. Fold mirror 70 advantageously shortens the overall longitudinal length of the optical axis which allows DMIA 22 to be more compact.

An imaging subsystem 84 includes a first lead screw 86 and a second lead screw 88 where each lead screw is approximately parallel with second optical axis 72. A lens 90 is connected to a first carriage 92 which is linearly adjustable by rotating first lead screw 86. Lens 90 includes stop 94 and f-stop adjustment 96 which can adjust the aperture of stop 94. Lens 90 can have a fixed focal length of 50 mm, for example. This focal length has the advantage of a relatively large depth of focus. A rough formula used to quickly calculate depth of focus is the product of the focal length times the f-stop divided by 1000, which yields a depth of focus of 0.55 mm for a 50 mm focal length and f11 f-stop adjustment. An area sensor 97 is connected to a second carriage 98 which carriage is linearly adjustable by rotating second lead screw 88. Area sensor 97 can be an area array CCD sensor with a two dimensional array of sensor elements or pixels, for example, with a 3.5 $\mu m^2$ pixel size, or other types of sensors and pixel sizes depending on resolution size requirements. The area array nature of sensor 97, when compared to a line sensor, eliminates the need for scanning of the sensor when viewing two dimensional images. The overall novel optical layout of the present invention including the separately adjustable area sensor 97 and lens 90; 45 degree fold mirror 70; and film table 44 location; algorithms for moving the lens and sensor to appropriate respective locations to achieve proper magnification and focus of the image; and the lens focal length and relatively large depth of focus, allows DMIA 22 to autofocus without the need for iterative measurements and refocusing the of lens 90 during magnification changes to accommodate different reduction ratios of different film media. Further, the present invention can easily accommodate reduction ratios in the range of 7× to 54×, although the present invention is not limited to such a range.

A first motor 100 is rotationally coupled to first lead screw 86 by a timing pulley, a belt with teeth, and another timing pulley, similar to timing pulley 120, belt 122 with teeth, and timing pulley 124, respectively, and a second motor 108 is rotationally coupled to second lead screw 88 by a timing pulley, a belt with teeth, and another timing pulley, also similar to timing pulley 120, belt 122 with teeth, and timing pulley 124, respectively. A controller 116 is electrically connected to first motor 100, second motor 108 and area sensor 97, where controller 116 is for receiving commands and other inputs from computer 24 or other input devices, controlling first motor 100 and second motor 108, and other elements of DMIA 22, and for outputting an image data of area sensor 97. Consequently, controller 116 can include one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36.

A third motor 118 is rotationally coupled to area sensor 97, where controller 116 additionally controls third motor 118 through electrical connections as with motors 100 and 108. For example, controller 116 can rotate area sensor 97, using motor 118, timing pulley 120, belt 122 with teeth, and timing pulley 124, to match an aspect ratio of microform media 46, and particularly an aspect ratio of images 60. A light baffle 126 can be connected to area sensor 97 to reduce stray light incident on sensor 97 and thereby further improve the resolution and signal to noise of DMIA 22. Light baffle 126 can have an antireflective coating at the front and inside surfaces of the baffle to further reduce stray light incident on sensor 97. Motors 100, 108 and 118 can be DC servomotors, or other motors.

Figure 5:
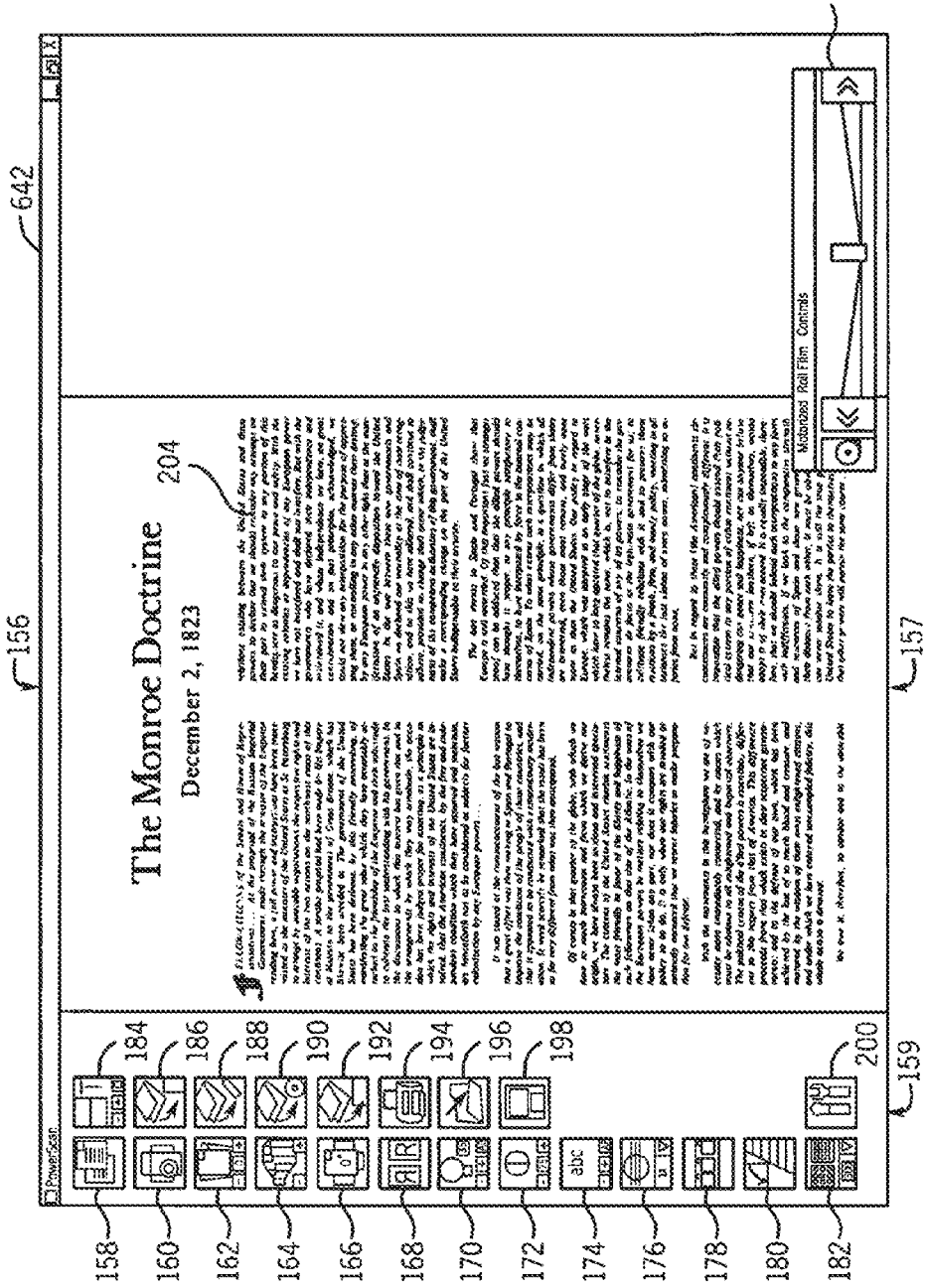
FIG. 5 is a screen shot of an embodiment of a computer user interface of the digital microform imaging system of FIG. 1, including image data.

Referring to FIG. 5, computer 602 includes a software computer user interface (CUI) 156 displayed by monitor 642 with user inputs to control DMIA 22 in general, and particularly, illumination system 36, motors 100, 108 and 118, and other elements of DMIA 22. CUI 156 can be in the form of at least one instruction executed by the at least one processor 604, where the instructions of CUI 156 are stored on computer-readable storage medium such as any number of program modules stored on hard disk 616, magnetic disk 620, optical disk 624, ROM 612, and/or RAM 610, or other computer-readable storage medium. CUI 156 generally includes a display area 157 and a toolbar 159 with user selectable controls as follows. Toolbar 159 can include the following software user input buttons: positive/negative film type 158; landscape/portrait film orientation 160; rotate optical 162 for rotating third motor 118; optical zoom 164 which controls first motor 100 and second motor 108; digital image rotation 166; mirror image 168 for adjusting for when media 46 is placed on support 44 upside down; brightness 170 which adjusts the speed of sensor 97; contrast 172; focus 174 with manual focus (−/+) and autofocus (AF), also controlling first motor 100; digital magnifier 176; live button 178; scan type/ selecting grayscale, grayscale enhanced, halftone 180; resolution/image capture 182; scan size button for prints/fit to page 184; save image scan to computer drive #1 186; save image scan to computer drive #2 188; save image scan to computer drive #3 190; save image scan to email 192; print image 194; restore settings 196; save settings 198; setup/tools 200; and motorized roll film controls 202 for embodiments with motorized roll film attachments. These controls of toolbar 159 can be selected by a user with a left click of mouse 636. Other toolbar input selections are contemplated.

Figure 6:
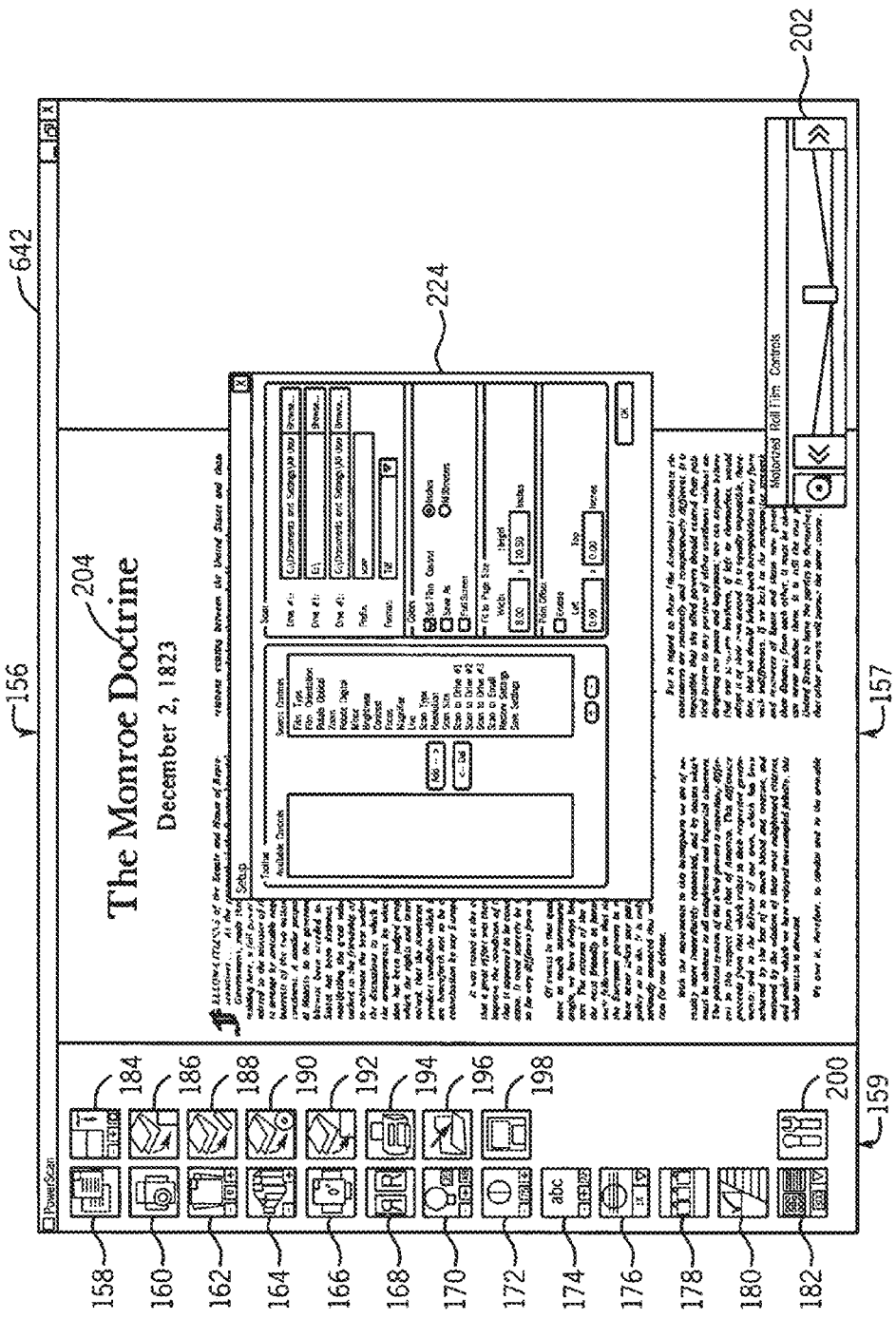
FIG. 6 is a screen shot similar to FIG. 5, but also including a setup dialog box.

FIG. 6 illustrates the configurable nature of CUI 156, and more particularly toolbar 159. Selecting setup/tools 200 opens dialog box 224. Toolbar controls and other parameters are added, deleted and/or changed as shown by dialog box 224.

Figure 7:
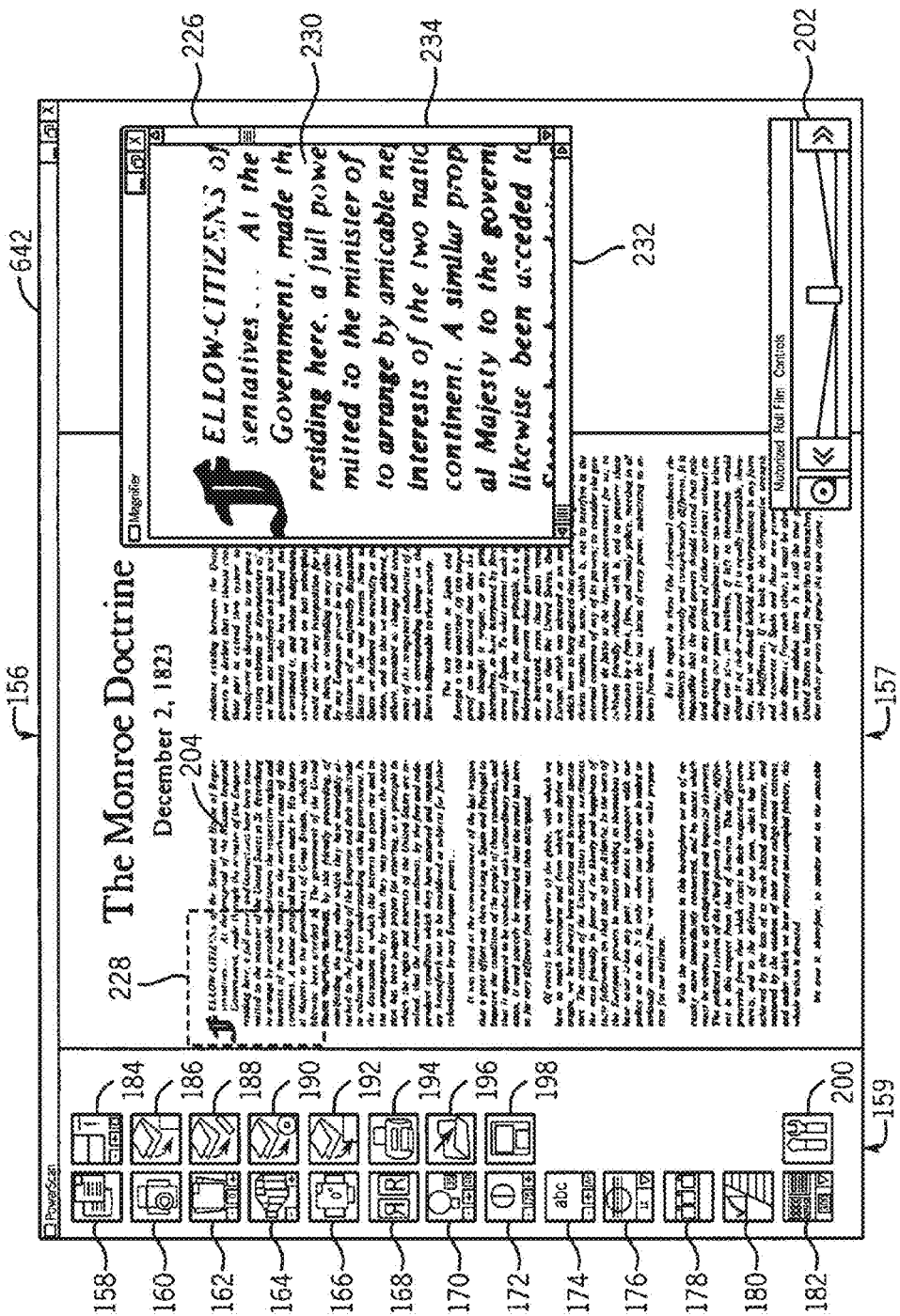
FIG. 7 is a screen shot similar to FIG. 5, but also including a digital magnifier window.

FIG. 7 illustrates a particularly advantageous aspect of CUI 156. By selecting the optical zoom 164, a user can select the magnification of image data 204 derived from microform segment 60. However, it is generally advantageous to select this optical magnification such that image data 204 includes all of the data of a particular microform segment 60, so that a user knows, at least in general, what elements or data are on this segment, and for subsequent printing, storing or emailing of the segment 60. However, depending on the size of monitor 642, the quality of the originally scanned record, the reproduction quality of microform media 46 and segment 60, and the resolution capabilities of DMIA 22, image data 204 may not be readable, or easily readable, by a typical user.

By selecting the magnifier glass portion of digital magnifier 176, CUI 156 creates magnifier window 226. An indicator box 228 identifies which subsegment 230 of image data 204 is being illustrated in magnifier window 226. By clicking on indicator box 228 and dragging it around image data 204 a user can pan around image data 204, with the subsegment data of new locations being shown in magnifier window 226. However, the data within indicator box 228 itself is not magnified, and indicator box 228 itself does not provide the functionality to expand indicator box 228. Instead, selecting the arrow portion of digital magnifier 176 selects the digital magnification of the subsegment 230 of image data 204 within magnifier window 226, and magnifier window 226 can be expanded transversely, longitudinally and diagonally by placing the cursor on one of the sides, or a corner, and mouse clicking and dragging to expand magnifier window 226, as is typical in windows of Windows® operating system. Scroll bars 232, 234 of magnifier window 226 can be used to scroll within window 226. Although indicator box 228 moves and expands with magnifier window 226, the data within indicator box 228 is not digitally magnified, in contrast with the data within magnifier window 226.

A programmer with ordinary skill in the art in Windows® operating system including callable subroutines, or other operating systems and their callable subroutines, and C++ or Visual Basic programming language can create the CUI 156 as shown in FIGS. 5-7 and defined above.

The imaging system 20 provides a multi-mode feature that allows for simultaneously imaging a document image onto an area sensor, selectively converting that same image into a multi-mode image including, e.g., color, grayscale, and/or black and white (also known as lineart or one bit, as would be known by one skilled in the art), and displaying that same document image onto the electronic display 642. It is important to note that the document image and the display image can be one in the same, meaning that the image on the display is a live image in real-time of what the area sensor is sensing. Furthermore, embodiments of the invention are applicable to original document images as imaged by other types of document scanners. The multi-mode feature serves to preserve the image detail of pictures and at the same time minimize file size.

Figure 8:
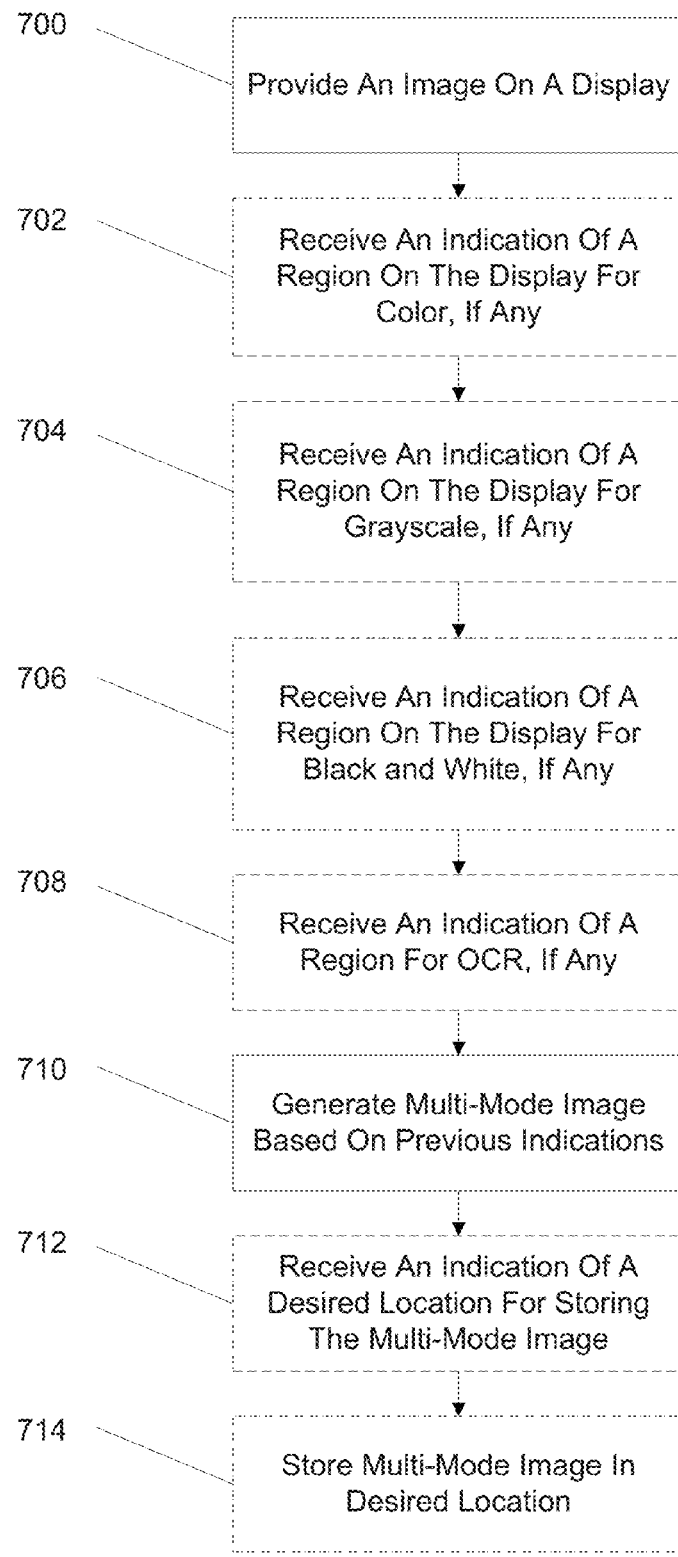
FIG. 8 is a flow chart of an embodiment of a method according to embodiments of the present invention.

FIG. 8 illustrates an embodiment of a method according to the present invention. This method is one in which the user could manually input what mode the user wants for each portion of an image. As such, many of the steps for the method are optional. The method may also be performed automatically by processing unit 604. At step 700, the method can include providing an image on a display, such as display 642, the image on the display being a real-time image that is streamed live from the area sensor 97 at that moment in time, e.g., the display is a live image in real-time of what the area sensor is sensing. At step 702, the user may indicate a region of the image on the display to be assigned a color mode, for example, a color picture. This step is optional for the user. The image may not have a section with color or the user may wish to save the color part of the image in another mode for an even smaller file size. At step 704, the user may indicate a region of the image on the display to be assigned a grayscale mode, for example, a grayscale picture. This step is also optional for the user. The image may not have any section that is in the grayscale mode or the user may wish to assign that section of the image in another mode. At step 706, the user may indicate a region of the image on the display to be assigned a black and white mode, for example, a region of the image that contains text. Step 706 is another optional step for the user. The image may not contain text or black and white pictures to save in the black and white mode. At step 708, the user may indicate a region of the image on the display to be OCR'd. This step is optional for the user. The image may not have any text or the user may not wish the text to be recognized.

At step 710, processing unit 604 can generate a multi-mode image 770 based on at least one of the indications made by the user. The multi-mode image 770 can contain one or more different types of formats or modes including color, grayscale, and black and white, as non-limiting examples. The multi-mode image may also contain OCR'd text if the image had text and the user made an indication to processing unit 604 to OCR text. At step 712, processing unit 604 may ask the user to provide a location to store the multi-mode image 770 as a multi-mode image file 772. This step is optional for processing unit 604 and for the user. In some embodiments, the multi-mode image file 772 can be saved as a PDF file format. In other embodiments, other file formats can be used, such as the TIFF, JPEG and PNG file formats, as a non-limiting examples.

The PDF file format is capable of supporting multi-bit color, for example 24 bit color, multi-bit grayscale, for example 8 bit grayscale, and 1 bit black and white, within the same file. Therefore, in the case of creating a multi-mode image as a PDF file, areas defined as color would be saved as multi-bit color, areas defined as grayscale would be saved as multi-bit grayscale and areas defined as black and white would be saved as 1 bit black and white.

Other file formats such as TIFF, JPEG, and PNG do not presently support multiple modes within the same file. Consequently, in the case of these file formats, if the document contained color, grayscale, and black and white areas and the preservation of color was desired, the entire file must be saved in the color mode. If the image contained only grayscale and black and white areas, and the preservation of grayscale was desired, the entire file must be saved in the grayscale mode.

To achieve a smaller file size while preserving the highest image quality when using file formats that do not support multiple modes within the same file, pixel values in each defined area (color, grayscale, black and white) are programmatically limited to the minimum pixel variation necessary to support the assigned mode for each area. For example, in the case of an image containing color, grayscale, and black and white areas, the entire file would be saved in the color mode. If this file were 24 bit color for example, color areas would be represented by pixels of all values supported by 24 bit color, grayscale areas, although 24 bit, would be represented by pixels limited to grayscale values only, black and white areas, although 24 bit, would be represented by pixels limited to black and white values only. To further describe this, 24 bit color is comprised of 8 bits for red, 8 bits for green, and 8 bits for blue. Pixel values for color areas could be 0-255 for red, 0-255 for green, and 0-255 for blue. Pixel values for grayscale areas would be limited to values where the 8 bits of red, green, and blue were all equal. Pixel values for black and white would be limited to red, green, and blue values would be 0 to represent black, and red, green and blue values would be 255 to represent white. Limiting color values in this way results in more efficient compression in these file formats.

The user may change the settings of the program so that processing unit 604 does not ask for a location to store the multi-mode image file 772. The user may also change the settings so that processing unit 604 stores the multi-mode image file 772 to a previously identified location automatically. In addition, the user may choose not to provide a location to which processing unit 604 would store the multi-mode image file 772. At step 714, the multi-mode image file 772 may be stored in the location indicated by the user. This step will only occur if the user has indicated a location to which processing unit 604 should store the multi-mode image file 772. Once again, the user may indicate the location to which processing unit 604 may store the multi-mode image file 772 at the time the multi-mode image 770 is created or earlier in the process by changing the program settings to store the multi-mode image file 772 to a location automatically.

As stated above, the method of FIG. 8 may be performed automatically by processing unit 604. Processing unit 604 may go through the same or steps as listed above for manually generating a multi-mode image 770 simultaneously with providing the multi-mode image 770 on the display. Processing unit 604 may be configured to automatically recognize the composition of an image having different modes, e.g., color, grayscale, and black and white. Processing unit 604 may also be configured to automatically recognize and OCR text within the multi-mode image 770 on the display. As stated above, processing unit 604 may be configured to automatically store the multi-mode image 770 as a multi-mode image file 772 to a desired location indicated by the user either in the settings for automatic storage or at the time of displaying the multi-mode image 770 for manual storage. The user may also select not to store the multi-mode image 770 created by processing unit 604. The user may just want a print out or scan of the multi-mode image 770 from a printer 774 or scanner 776 as opposed to a copy of the multi-mode image 778 saved in memory 778, for example.

Figure 9:
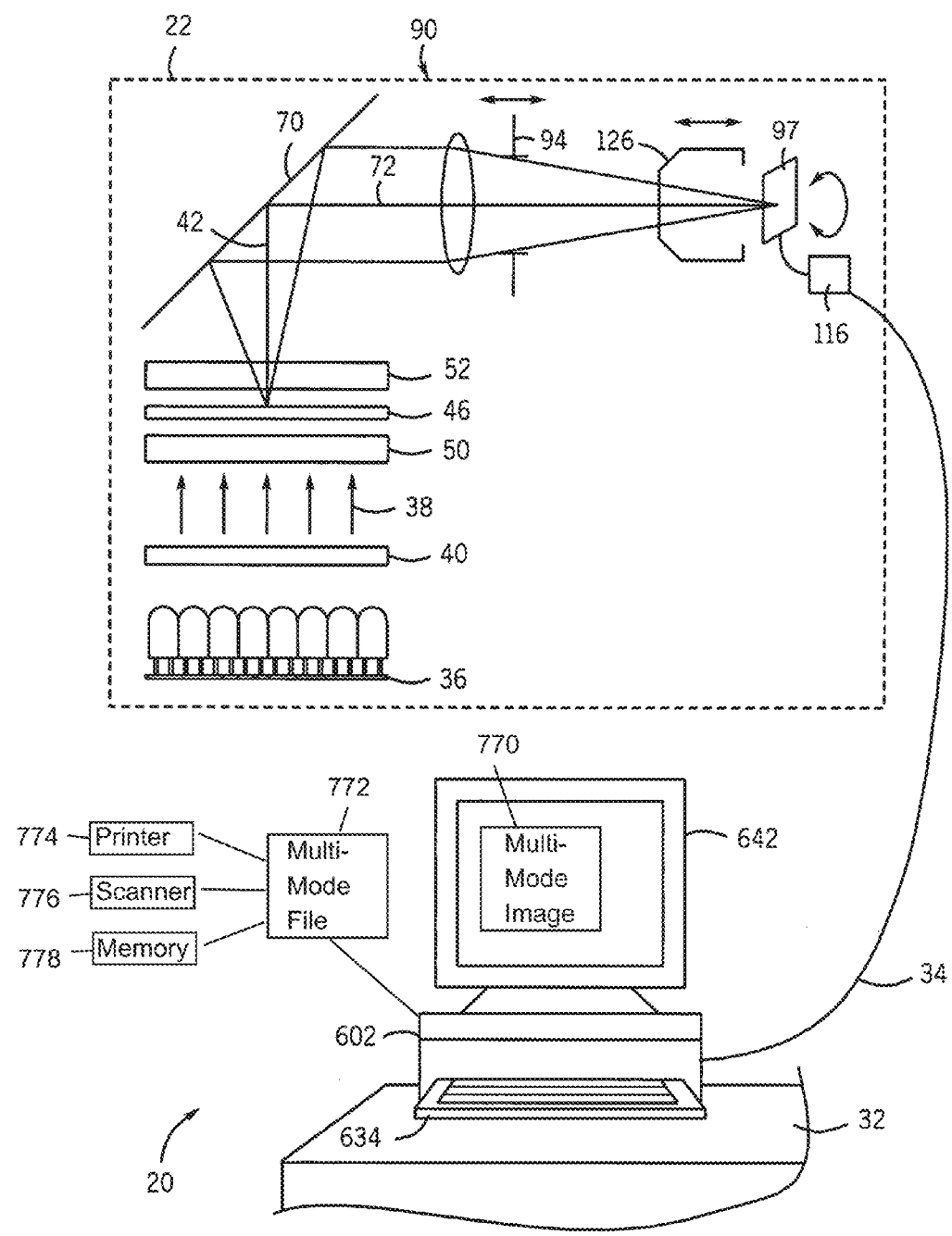
FIG. 9 is a schematic view of the digital microform imaging system of FIG. 1 according to embodiments of the present invention.

Referring to FIG. 9, multi-mode feature of the imaging system 20 can be used in the following manner. A document image can be projected onto an area sensor 97 (color or monochrome). Digital output, referred to as an image file, from the area sensor of the projected document image can be streamed to a computer, for example, at a rate of several frames per second, such as five frames per second as a non-limiting example. The area sensor digital output of the projected document image can be displayed onto the computer display 642. Specific areas of the projected document image can be defined automatically, or can be manually defined by a user, as discussed below. The brightness and contrast adjustments can be modified to the specific areas selected either individually or collectively. The mode, e.g., color, grayscale, and/or black and white of these specific areas can be modified either individually or collectively. The projected document image can be displayed on the computer display as modified. The projected document image as modified can then be printed or scanned or stored to memory or stored to a non-volatile storage medium in a selected file type, for example.

Figure 12:
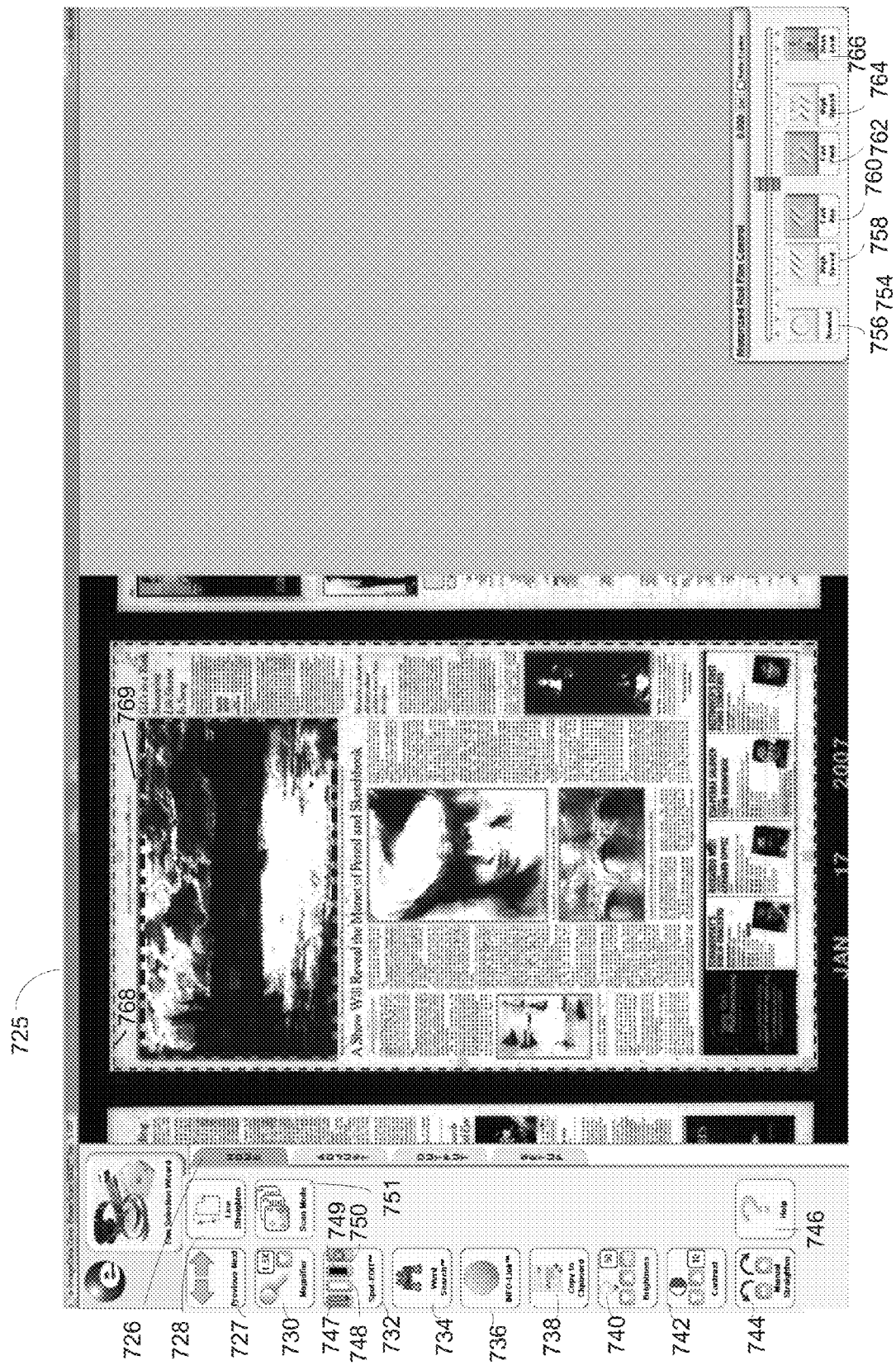
FIG. 12 is an example of an embodiment of a user interface for using with the present invention.
Figure 16:
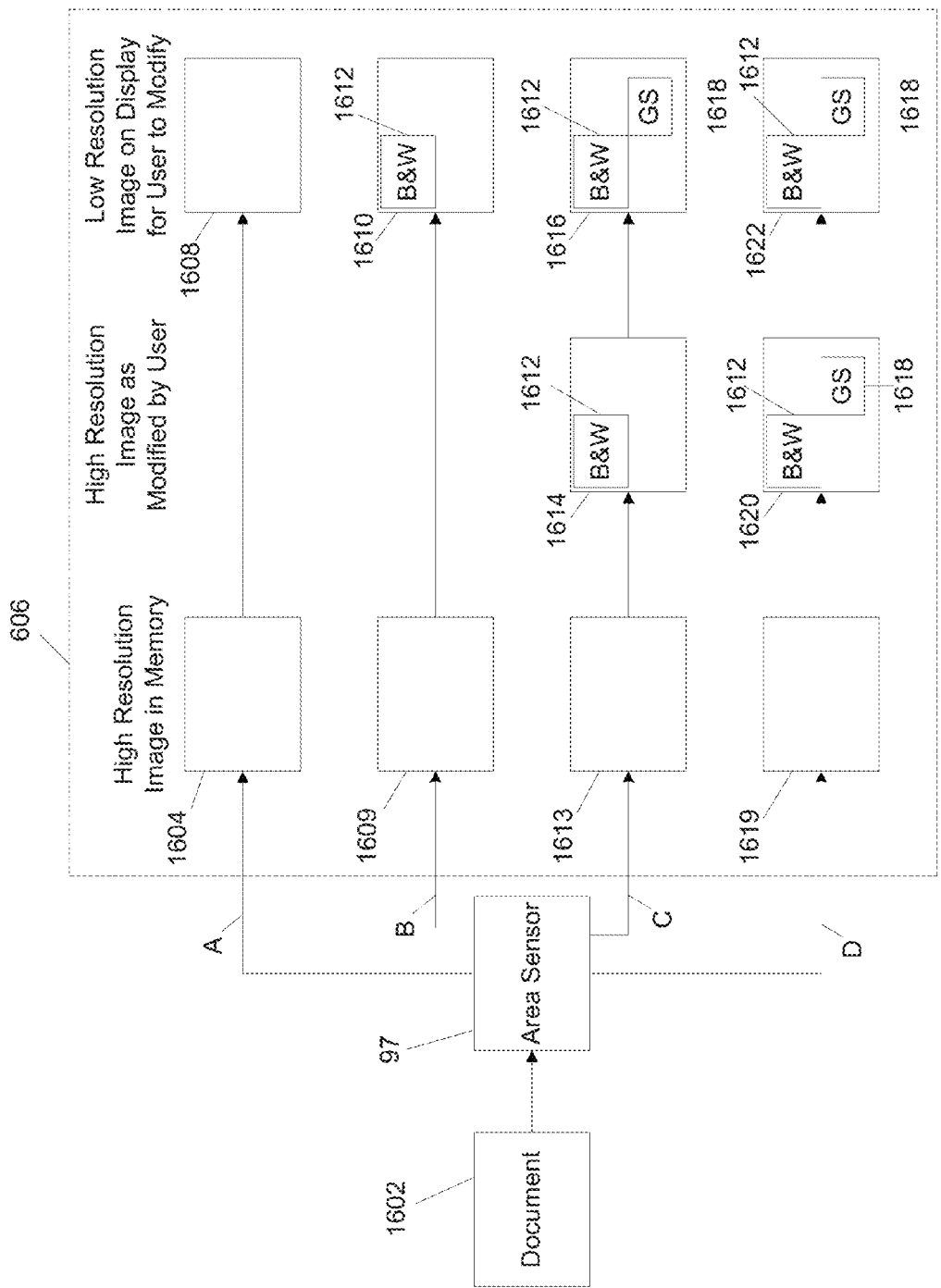
FIG. 16 is an example of a process in which a processor may work with a color sensor to project an image onto a display where the user can edit the image.

FIG. 16 illustrates a non-limiting example of how a processor (such as processor 604 shown in FIG. 13) may work with color sensor 97 to form an image of document 1602 onto a display (such as monitor 642 shown in FIG. 13) where the user can modify the image of document 1602 using a user interface (such as the user interface 725 shown in FIG. 12). In this embodiment, color sensor 97 can be exposed to an image of document 1602 and store it in memory (such as system memory 606) as high resolution image 1604. If document 1602 is being imaged for the first time, color sensor 97 may store the image of document 1602 entirely in color, as a non-limiting example. In some embodiments, the first time the document has been imaged, the processor may convert high resolution image file 1604 into low resolution image file 1608, although a conversion is not required. The user may modify high resolution image file 1604 or low resolution image file 1608 using the user interface on the display. The user may also choose not to modify image file 1604 or 1608.

As can be seen in FIG. 16, the first time document 1602 is imaged, the image of document 1602 is stored in memory as high resolution image 1604. In the first example A, the user has not yet defined an area of image 1604 to be modified. The processor then converts high resolution image 1604 to low resolution image 1608 and forms low resolution image 1608 on a display. Color sensor 97 may be continuously refreshing the high resolution image stored in memory, for example, at five frames per second, as a non-limiting example, so the user may not modify the high resolution image stored in memory before the next frame. Color sensor 97 may be continuously refreshing the high resolution image because document 1602 may be updated by a user. Updates to document 1602 may include changing document 1602 in any way the user so chooses, such as writing on the document, as a non-limiting example. In the second example B of color sensor 97 refreshing document 1602, high resolution image 1609 is the same image as high resolution image 1604 because the user has not yet defined an area of low resolution image 1608 to modify. In the instance of forming high resolution image 1609 on the display as low resolution image 1610, the user has chosen to define area 1612 on low resolution image 1610 for the black and white mode.

Color sensor 97 then stores an image of document 1602 as high resolution image 1613 once again. In this third example C, the processor recognizes that the user has modified low resolution image 1610 to include area 1612 in black and white mode. The processor then can store high resolution image 1613 as modified high resolution image 1614 with area 1612 including the black and white mode modification. The processor may then convert modified high resolution image 1614 into low resolution image 1616 with area 1612 including the black and white modification and form low resolution image 1616 on the display. The user can then decide to define area 1618 on low resolution image 1616 for the grayscale mode, for example. Grayscale is identified as GS in FIG. 16.

In the fourth example D, color sensor 97 can then store an image of document 1602 as high resolution image 1619 once again. The processor recognizes that the user has modified low resolution image file 1616 to include area 1618 including the grayscale mode and stores high resolution image 1619 as modified high resolution image 1620 with both area 1612 including the black and white mode modification and area 1618 including the grayscale mode modification. The processor can then convert modified high resolution image 1620 into low resolution image 1622 and form low resolution image 1622 with the modified areas 1612, 1618 on the display, where the user may make more modifications. This process can continue until the user has made all the modifications, including area definitions, the user chooses to make or until the user decides to move on to another document or perform some other function, such as save or print, as non-limiting examples.

Figure 17:
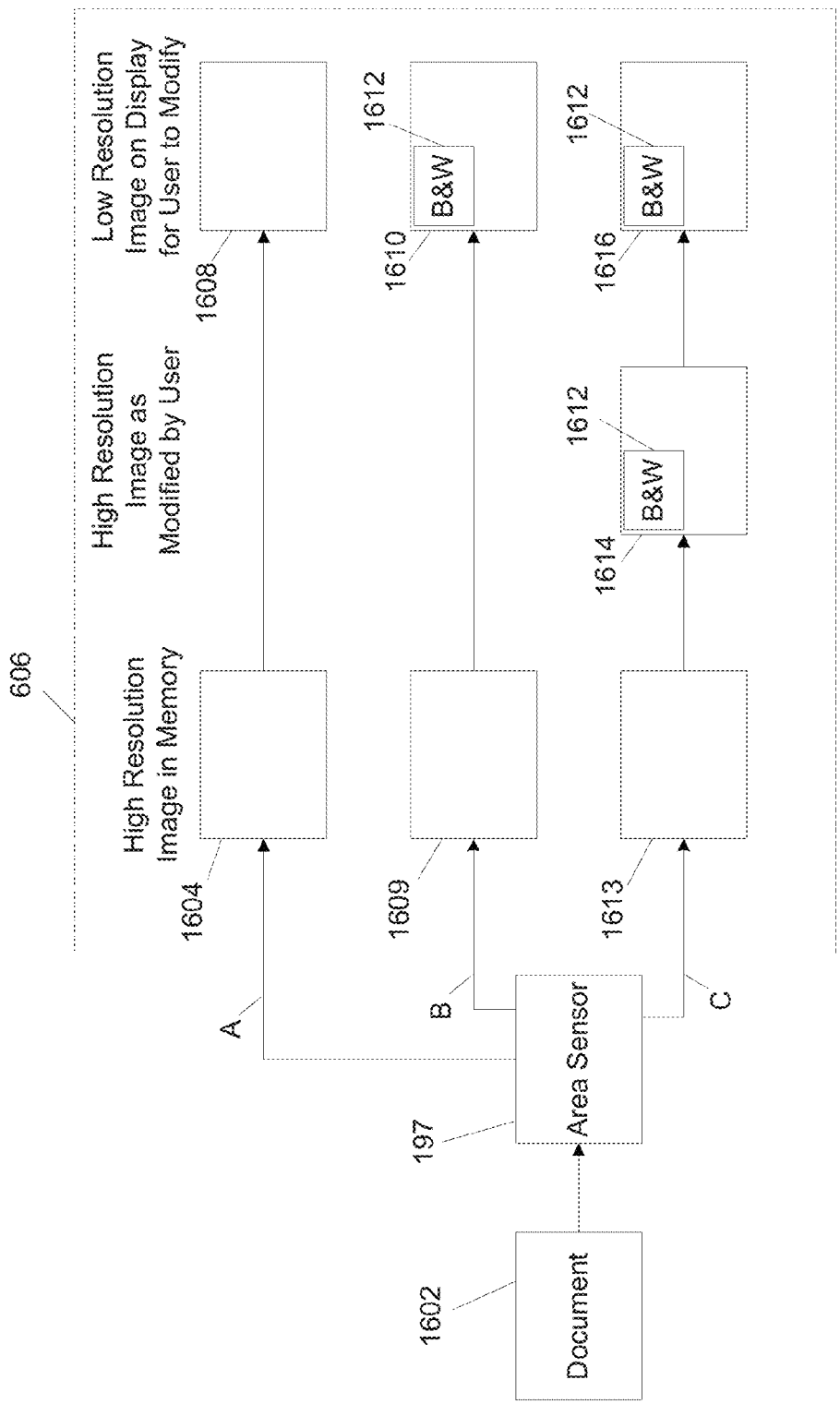
FIG. 17 is an example of a process in which a processor may work with a monochrome sensor to project an image onto a display where the user can edit the image.

Referring to FIG. 17, an alternative embodiment is shown where area sensor 97 can be monochrome sensor 197. The image of document 1602 can be modified using the user interface 725 in the same fashion as described above with reference to FIG. 16, except that because the monochrome sensor produces a grayscale image, the option for selecting an area for a color mode is not available.

The first time document 1602 is imaged, the image of document 1602 is stored in memory as high resolution image 1604. In the first example A, the user has not yet defined an area of image 1604 to be modified. The processor then converts high resolution image 1604 to low resolution image 1608 and forms low resolution image 1608 on a display. Monochrome sensor 197 may be continuously refreshing the high resolution image stored in memory, for example, at five frames per second, as a non-limiting example, so the user may not modify the high resolution image stored in memory before the next frame. Monochrome sensor 197 may be continuously refreshing the high resolution image because document 1602 may be updated by a user. Updates to document 1602 may include changing document 1602 in any way the user so chooses, such as writing on the document, as a non-limiting example. In the second example B of monochrome sensor 197 refreshing document 1602, high resolution image 1609 is the same image as high resolution image 1604 because the user has not yet defined an area of low resolution image 1608 to modify. In the instance of forming high resolution image 1609 on the display as low resolution image 1610, the user has chosen to define area 1612 on low resolution image 1610 for the black and white mode.

Monochrome sensor 197 then stores an image of document 1602 as high resolution image 1613 once again. In this third example C, the processor recognizes that the user has modified low resolution image 1610 to include area 1612 in black and white mode. The processor then can store high resolution image 1613 as modified high resolution image 1614 with area 1612 including the black and white mode modification. The processor may then convert modified high resolution image 1614 into low resolution image 1616 with area 1612 including the black and white modification and form low resolution image 1616 on the display. Additional black and white areas can be defined. This process can continue until the user has made all the modifications, including area definitions, the user chooses to make or until the user decides to move on to another document or perform some other function, such as save or print, as non-limiting examples.

Although not shown in FIG. 16 or 17, the user may also select one or more of the defined areas or define new areas for OCR. Alternatively, in some embodiments, this process could be performed automatically by an algorithm that can identify what sections should be in grayscale, black and white, and color, for example. In addition, the algorithm could identify text to be OCR'd and OCR that text.

It is to be appreciated that additional area sensor technologies are also contemplated, in addition to color and monochrome sensors, as would be understood by one skilled in the art. For example, area sensors can support reading only sub sections of the sensor, and can be used in the same or similar ways as described above for both color and monochrome sensors.

Area sensors that support decimation are also contemplated for use. Area sensors that support decimation can read out every other, every third, or every 4th pixel, for example. Reading fewer pixels reduces resolution, however it also speeds up refresh rate. Further, some are sensors allow for the selection of switching the entire sensor from color to grayscale to black and white. It is also to be appreciated that area sensors that can support multiple modes simultaneously are also contemplated for use in the same or similar ways as described above for both color and monochrome sensors.

In some embodiments, the imaging subsystem can output a grayscale image. Characteristics of that grayscale image, such as brightness and contrast, can be controlled by the imaging subsystem. Commands can be passed from the computer to the imaging subsystem to change the brightness and contrast of the output image. Brightness and contrast adjustments made generally apply to the entire image.

The imaging system 20 can receive and display the grayscale image. Once a specific area is defined, if a brightness and/or contrast adjustment to that area is requested via controls of the user interface 725 discussed below, a command can be sent to the imaging subsystem and the requested brightness and/or contrast adjustments can then be applied to the next image (the area sensor can output images at a rate of several frames per second) output to the computer. Because this brightness and contrast affects the entire image, not just the specific area, the state of all other areas can be held in memory and only the specific area of the new image can be replaced in memory.

Figure 10:
FIG. 10 is an example of a single-mode image generated in grayscale mode.
Figure 11:
FIG. 11 is an example of a multi-mode image generated in both black and white and grayscale modes using the present invention.

FIGS. 10 and 11 illustrate a non-limiting example of the differences between generating a multi-mode image containing grayscale images and text in different file formats. FIG. 10 illustrates a single-mode image in grayscale mode alone. FIG. 11 illustrates a multi-mode image in grayscale mode with respect to the grayscale images and black and white mode with respect to the text and black and white pictures. As can be seen in the single-mode image of FIG. 10, grayscale images 716, 718, 720, 722, and 724 within the single-mode image have been generated in a grayscale mode. However, the text 721 is also in grayscale, making it dark gray in color instead of black in color and the background is in light gray instead of white in color. The file size for this single-mode file is approximately 6 MB in a TIF file format and 5 MB in a PNG file format. Other file format may also be used.

In comparison, and as can be seen in the document of FIG. 11, grayscale images 716, 718, 720, 722, and 724 are still generated in the grayscale mode. However, the text 723 has been generated in the black and white mode. This means the text 723 is actually black in color on a white background and is easier to read than the text 723 would be if it were dark gray in color on a light gray background. In addition, the file size of the multi-mode file of FIG. 11 is significantly smaller than the single-mode file of FIG. 10, that is 3 MB in a TIF file format (as opposed to the 6 MB of FIG. 9) and 2 MB in a PNG file format (as opposed to the 5 MB of FIG. 9).

FIG. 12 illustrates an example of an embodiment of a user interface 725 for use with the present invention. The user interface 725 can contain a home screen 726 having a variety of buttons used to control features of the imaging system 20. As non-limiting examples, control buttons can include previous and next buttons 727, a line straighten button 728, a spot EDIT button 730, a word search button 734, an INFO Link button 736, a copy to clipboard button 738, brightness buttons 740, contrast buttons 742, mode buttons 751, manual straightening buttons 744, and a help button 746. The previous and next buttons 727 allow the user to move between images.

The spot EDIT button 730 can have four sub-buttons: a pencil tool button 747, a white redact tool button 748, a black redact tool button 749, and a cancel zone button 750. The pencil tool button 747 can allow the user to draw the perimeter of a zone 769. Zones can be rectangular or irregular in shape and can be marked with borders. For example, when the user is finished drawing the perimeter of a zone, the perimeter of the zone 769 may become a magenta border to indicate that the zone is active. The active zone, the selected one for setting the mode (color, grayscale, and black and white), brightness, and contrast, may be marked with a bold border. A zone may be made active by moving a mouse cursor somewhere inside the border and left clicking. In some embodiments, when a zone is made active, the brightness 740, contrast 742, and mode 751 buttons can be highlighted to indicate that they are active. The mode and the brightness and contrast of each zone can be adjusted independently. The mode buttons 751 can be used to adjust the mode of the active zone between different types of modes including color, grayscale, and black and white, as non-limiting examples. The zones created by the user also may be automatically defined by processing unit 604, which may be designed to read the composition of the document, as stated above. The white redact tool button 748 allows the user to make the entire active zone white. The black redact tool button 749 allows the user to make the entire active zone black. The redact tools may be used for security purposes on images that have sensitive information. The user also may just want to remove some of the information because of personal preference. The cancel zone button 750 allows the user to cancel the active zone or, if the cancel zone button 750 is double clicked, cancel all zones. The dashed line identifies a crop box 768. The crop box 768 can define the area to be printed, scanned, or emailed, as non-limiting examples. It is to be appreciated that the multi-mode image can be printed directly, without saving to a file, and retains the same beneficial characteristics of smaller file sizes, preserved image detail, and when selected, the preferred black text on a white background appearance. The user interface 725 can also contain an output screen 752 and a setup screen 753.

The word search button 734 allows the user to search for words in the image, and in some embodiments, without the text having been OCR'd. The INFO Link button 736 allows the user to search for selected words in an internet search engine or other information source. The copy to clipboard button 738 allows the user to copy the image to clipboard for later use by the user. The brightness buttons 740 allow the user to change the brightness of the active zone to the desired level. The contrast buttons 742 allow the user to change the contrast of the active zone to the desired level. The help button 746 brings up a screen to assist the user with various anticipated problems the user might have with the program.

The user interface 725 can also contain a motorized roll film control 754 designed for use with micro film. The motorized film control 754 contains a rewind button 756, a high speed reverse button 758, a fast reverse button 760, a fast forward button 762, a high speed forward button 764, and a lock button 766. The rewind button 756, high speed reverse button 758, fast reverse button 760, fast forward button 762, and a high speed forward button 764 allow the user to go back and forth on a roll of film at whatever speed is desired by the user. The lock button 766 allows the speed of the film to be held at a consistent slow speed.

Figure 13:
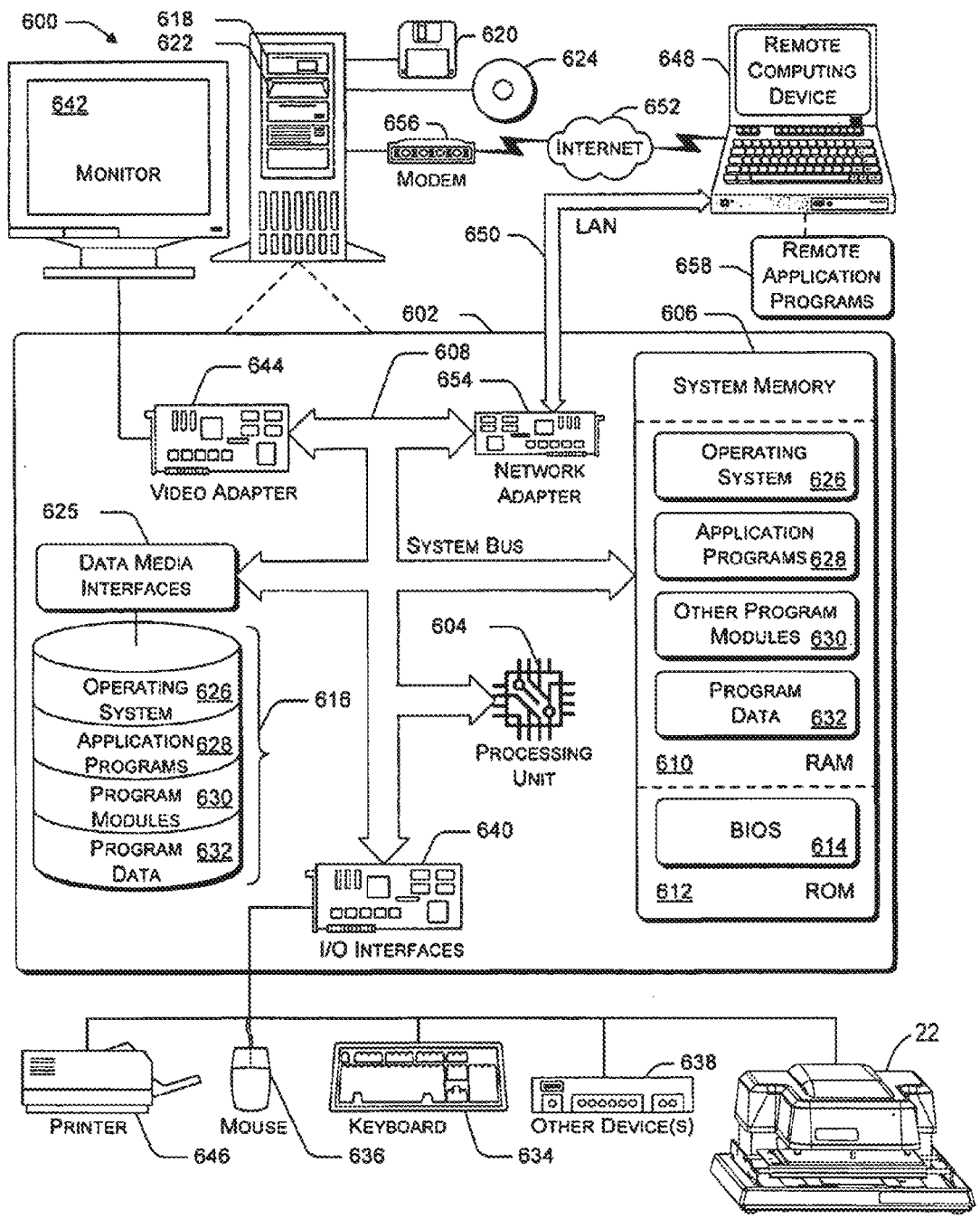
FIG. 13 is a schematic view of a general computing environment including the digital microform imaging system and computer of FIG. 1.

FIG. 13 illustrates a general computer environment 600, which can be used to implement the techniques according to the present invention as described above. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 5 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

One example of an application program 628 is an OCR engine used as described in the method of FIG. 8. The OCR engine may be a commercially available program. One such OCR engine is named ABBYY FineReader and is available from ABBYY USA, Inc.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640. In addition, monitor 642 may comprise a touch screen so as to allow the user to provide input to the processing unit 604 by simply touching the screen.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

The present invention is not limited by the DMIA 22 shown as there are other DMIAs, or microfilm or micro opaque readers, scanners, etc., which are available which can be used in conjunction with a computer and the CUI of the present invention. Further, the present invention is not limited by a separate DMIA 22 and computer 602. For example, computer 602 can be integrated into DMIA 22, or can be part of controller 116. Yet further, monitor 642 can be a part of DMIA 22, or one of these variation, instead of a separate device.

Figure 14:
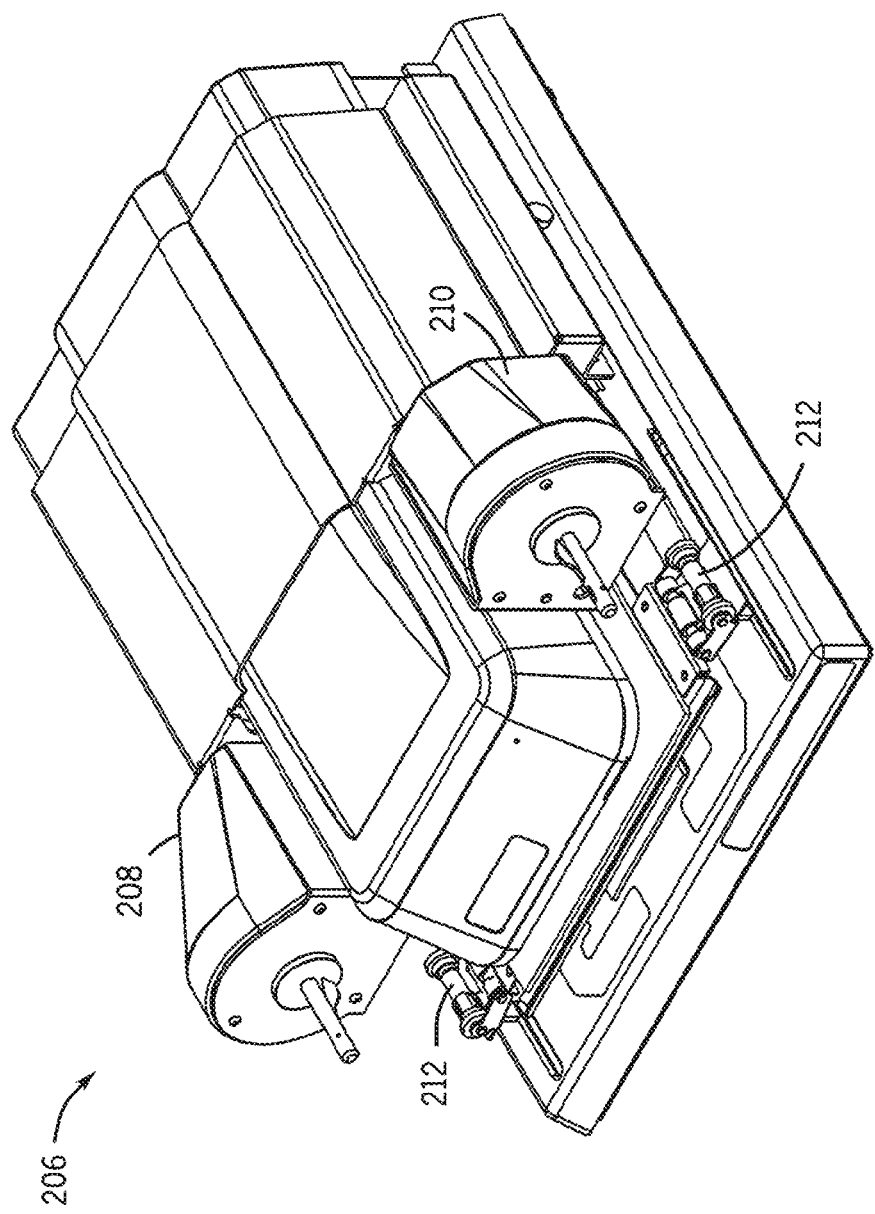
FIG. 14 is a perspective view of another embodiment of a digital microform imaging apparatus according to the present invention, particularly illustrating a motorized roll film microform media support.
Figure 15:
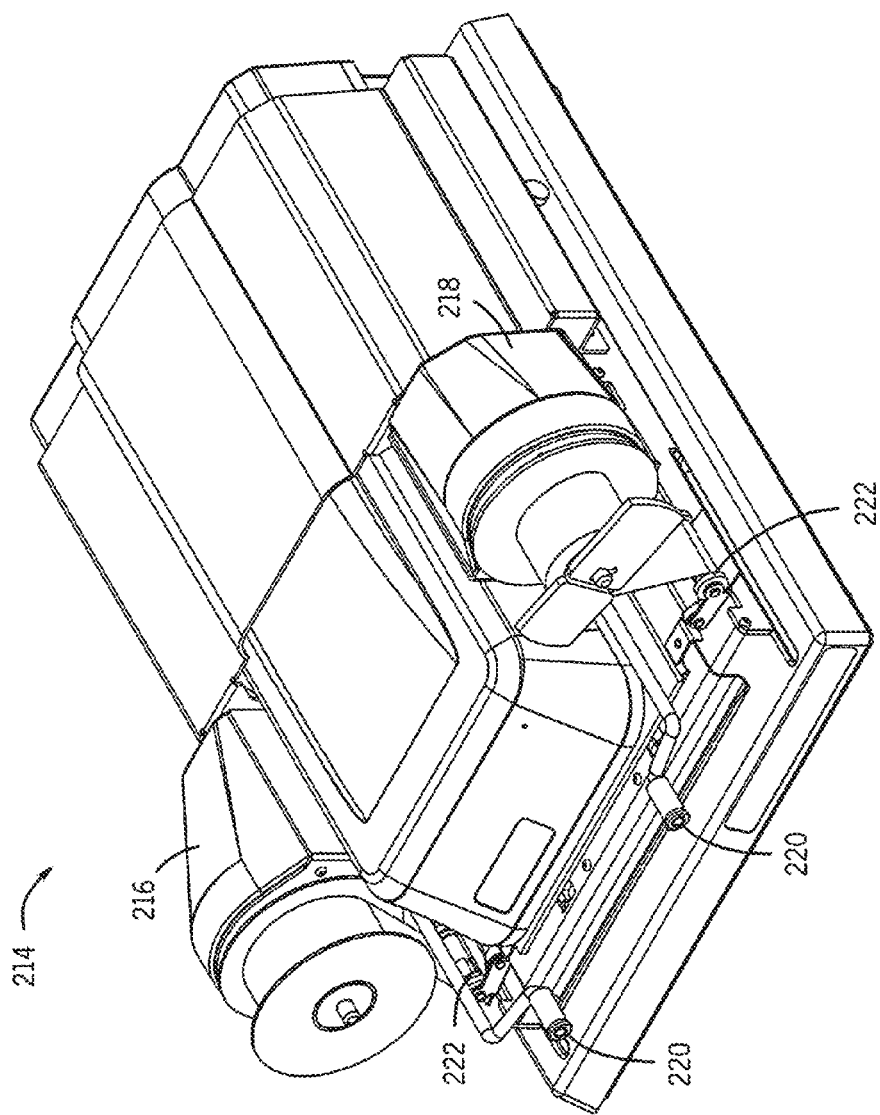
FIG. 15 is a perspective view of another embodiment of a digital microform imaging apparatus according to the present invention, particularly illustrating a hand operated roll film microform media support.

Media 46 can include any microform image formats such as microfilm/microfiche, aperture cards, jackets, 16 mm or 35 mm film roll film, cartridge film and other micro opaques. Micro opaques are different than transparent film. Images are recorded on an opaque medium. To view these micro images one needs to use reflected light. The present invention can use LED arrays 37 (FIGS. 5 and 6) for use with micro opaques, which can be the same, or similar to, the monochromatic LED's that are used in illumination source 36. In the embodiment of FIG. 14, DMIA 206 includes a microform media support in the form of motorized roll film attachment with supply side 208 and take up side 210 and film guides 212, in addition to X-Y table 44. In the embodiment of FIG. 15, DMIA 214 includes a microform media support in the form of hand operated roll film attachment with supply side 216 and take up side 218 with cranks 220, and film guides 222, in addition to X-Y table 44. In other ways, DMIAs 206 and 214 are similar to or the same as DMIA 22. Therefore, the microform media support structure according to the present invention is at least one of a X-Y table, a motorized roll film carrier, and a hand operated roll film carrier, and a cartridge film carrier.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

I claim:

1. A method for generating a multi-mode image file, the method comprising the steps of:
   forming an image of a document onto an area sensor;
   the area sensor creating a digital image of the document, the digital image having a first mode;
   selecting a region of the digital image to be modified;
   assigning a second mode different than the first mode to the selected region of the digital image, wherein the second mode is defined by a pixel variation;
   limiting the pixel variation to a minimum pixel variation necessary to support the second mode; and
   storing the modified digital image as a multi-mode image in memory.

2. The method of claim 1, further including displaying the multi-mode image on a monitor.

3. The method of claim 2, wherein the multi-mode image displayed on the monitor is an image generated from microform.

4. The method of claim 2, wherein the multi-mode image displayed on the monitor includes black and white and gray-scale.

5. The method of claim 2, further including a user selecting the region of the image on the monitor.

6. The method of claim 5, wherein selecting the region of the image on the monitor includes at least one of highlighting the region, placing a box around the region, and clicking on the monitor near the region.

7. The method of claim 5, wherein the monitor is a touch screen monitor, and wherein selecting the region on the monitor includes touching the monitor for selecting the region.

8. The method of claim 5, wherein selecting the region of the image on the monitor makes the region an active region.

9. The method of claim 8, further including adjusting a brightness or a contrast of the active region.

10. The method of claim 8, further including providing a software selection menu on the monitor, the software selection menu providing a selection of a plurality of modes for assigning to the active region.

11. The method of claim 10, wherein the plurality of modes includes color, grayscale, and black and white.

12. The method of claim 1, further including the area sensor streaming digital output of a projected document image to a monitor to display the image, such that the image on the display is a live image in real-time of what the area sensor is sensing.

13. The method of claim 1, wherein the first mode is a color mode.

14. The method of claim 13, wherein the second mode is a black and white mode or a grayscale mode.

15. The method of claim 1, wherein the first mode is a grayscale mode and the second mode is a black and white mode.

16. The method of claim 1, further including assigning a third mode different than the first mode and the second mode to another selected region of the digital image.

17. The method of claim 1, further including performing optical character recognition on the selected region.

18. A method for generating a multi-mode image file, the method comprising the steps of:
  providing an image on a video display, the image being displayed in a first mode;
  receiving an indication of a select region on the display for assigning a second mode;
  converting the select region on the display from the first mode to the second mode to generate the multi-mode image file, wherein the second mode is defined by a pixel variation;
  limiting the pixel variation to a minimum pixel variation necessary to support the second mode; and
  displaying the multi-mode image on the display, the multi-mode image on the display displaying both the first mode and the second mode.

19. The method of claim 18, wherein the first mode is a color mode.

20. The method of claim 18, wherein the second mode is a grayscale mode or a black and white mode.

21. The method of claim 18, further including receiving an indication of a location for storing the multi-mode image file; and storing the multi-mode image file in the indicated location.

22. The method of claim 18, further including adjusting a brightness or a contrast of the select region on the display.

23. The method of claim 18, wherein the steps of receiving, converting, and displaying are performed automatically by a processor.

24. A digital imaging system comprising:
  a digital imaging apparatus to image a document to generate a multi-mode image file;
  a computer including at least one processor and a computer-readable storage medium readable by the at least one processor, the computer-readable storage medium encoded with a computer executable instruction performing the following steps of:
  providing a digital image, the digital image having a first mode;
  selecting a region of the digital image;
  assigning a second mode to the selected region of the digital image to generate the multi-mode image file, wherein the second mode is defined by a pixel variation; and
  limiting the pixel variation to a minimum pixel variation necessary to support the second mode.

25. The digital imaging system of claim 24, wherein the at least one processor is further caused to:
  receive an indication of a location for storing the multi-mode image file; and
  store the multi-mode image file in the indicated location.

26. The digital imaging system of claim 24, further including an area sensor, the area sensor creating the digital image.

27. The digital imaging system of claim 24, wherein a user selects the region of the digital image.

28. The digital imaging system of claim 24, wherein the first mode is a color mode.

29. The digital imaging system of claim 28, wherein the second mode is a black and white mode or a grayscale mode.

30. The digital imaging system of claim 24, wherein the first mode is a grayscale mode and the second mode is a black and white mode.

31. The digital imaging system of claim 24, further including assigning a third mode different than the first mode and the second mode to another selected region of the digital image.

* * * * *